United States Patent [19]

Jolitz et al.

[11] Patent Number: 5,102,463
[45] Date of Patent: Apr. 7, 1992

[54] FLAME RETARDANT ASPHALT COMPOSITION

[75] Inventor: Randal J. Jolitz, Algonquin, Ill.; Donald R. Kirk, Pittsburg, Kans.

[73] Assignee: Tamko Asphalt Products, Inc., Joplin, Mo.

[21] Appl. No.: 430,117

[22] Filed: Nov. 1, 1989

[51] Int. Cl.$^5$ .................. C08L 95/00; C09D 5/18
[52] U.S. Cl. .................. 106/273.1; 106/18.22; 106/18.11
[58] Field of Search .......... 106/273.1, 284.04, 284.06, 106/18.22, 18.11

[56] References Cited

U.S. PATENT DOCUMENTS

| | | | |
|---|---|---|---|
| 2,935,471 | 5/1960 | Aarons et al. | 106/18.22 |
| 4,737,406 | 4/1988 | Bumpus | 106/18.22 |
| 4,804,696 | 2/1989 | Jolitz et al. | 524/71 |

*Primary Examiner*—A. Lionel Clingman
*Assistant Examiner*—Mary C. DiNunzio
*Attorney, Agent, or Firm*—Arnold, White & Durkee

[57] ABSTRACT

Disclosed is a fire retardant asphalt composition. The composition comprises:
(a) about 40-60% wt asphalt;
(b) about 1-20% wt thermoplastic;
(c) about 15-40% wt flame retarding agent; and
(d) the flame retarding agent comprises:
(i) about 65-95% weight ammonium sulfate,
(ii) about 1% weight silicone polymer.

2 Claims, No Drawings

FLAME RETARDANT ASPHALT COMPOSITION

BACKGROUND OF THE INVENTION

1. Field of the Invention

The present invention relates to a flame retardant asphalt composition. More specifically, the invention relates to a thermoplastic modified asphalt composition that includes a flame retardant coated with a silicone polymer.

2. Background

Asphalt is an excellent sealing and adhesive material. As such, asphalt is used extensively in the roofing industry. All sorts of roofing materials contain asphalt, including shingles and roofing paper.

Notwithstanding its excellent sealing and adhesive characteristics, asphalt has one major drawback. Asphalt is very combustible. As such, it is important to reduce the combustibility of an asphalt composition.

Many localities have regulations that require roofing materials to conform to certain standards. For instance, many such regulations require that roofing materials qualify as a Class A material under UL 790 or ASTM E-108 standards. These standards measure flame spread for non-combustible based decks and flame spread and brand penetration for combustible based decks.

Presently available flame retardant asphalt compositions have had difficulty in qualifying as a Class A material. Many of those that have passed include expensive and sometimes toxic ingredients. As such, the compositions are expensive and possibly dangerous.

Other presently available Class A flame retardant asphalt compositions include large quantities of non-combustible inert fillers. These materials are often heavy which may cause material handling problems.

Accordingly, a need exists to provide a thermoplastic modified asphalt material that is suitable for use on dwellings, schools and public facilities under the regulations now in force throughout the United States.

SUMMARY OF THE INVENTION

The present invention addresses the current need for an inexpensive flame retardant asphalt composition for roofing materials. The inventive composition includes asphalt, a thermoplastic and a flame retarding ingredient. Preferably, the composition comprises by weight about 45-65% asphalt, about 1-20% thermoplastic and about 15-40% flame retarding ingredient ("flame retardant"). Preferably, the flame retardant includes by weight about 65-95% ammonium sulfate and about 1-5% methyl hydrogen polysiloxane. Some inert fillers may be added to complete the composition.

The composition is manufactured by mixing the asphalt and a thermoplastic at temperatures between about 325°-425° F. Next, the flame retardant is added and mixed into the modified asphalt, preferably by a paddle mixer. As such, the composition is easy to make.

A major ingredient of the flame retardant is ammonium sulfate.

Ammonium sulfate is soluble in water and has a tendency to leach out of compositions exposed to water. As such, ammonium sulfate has not been used as a major ingredient in a flame retardant asphalt composition.

The flame retardant includes a methyl hydrogen polysiloxane ("silicone polymer") that forms a film. The film is a surface treatment that prevents water adsorption and absorption. As such, the film makes the flame retardant water repellent. The film also allows the flame retardant to withstand higher processing temperatures and UV radiation.

Presently, the preferred composition costs less and performs better than the compositions claimed in applicants' U.S. Pat. No. 4,804,696 DRK; RJJ and co-pending application relating to a potassium citrate composition.

The features and advantages of the present invention are meant to be illustrative rather than exhaustive. Further advantages and features of the present invention will become apparent while reviewing the detailed description of the invention.

DETAILED DESCRIPTION OF THE INVENTION

The present invention comprises three ingredients:
(1) bitumen;
(2) a thermoplastic; and
(3) a flame retarding agent.

The bitumen ingredient preferably includes petroleum asphalt. Preferably, this ingredient comprises about 45-65% by weight of the composition. It is preferred that the bitumen ingredient be 58.8% of the composition.

The thermoplastic ingredient may include thermoplastic elastomers or thermoplastic rubbers including scrap thermoplastics. More specifically, this ingredient is preferably styrene-butadiene-styrene (SBS). The thermoplastic is blended with the bitumen at temperatures between 325° and 425° F.

Preferably, the flame retardant comprises between about 15-40% of the composition. The ingredients of the flame retardant include, preferably, about 65-95% ammonium sulfate and about 1-5% methyl hydrogen polysiloxane. The flame retardant is mixed into the thermoplastic modified bitumen. Preferably, the bitumen is maintained at 325°-425° F. during mixing.

The most preferred flame retardant is 26.7% wt of the composition and comprises:
(1) about 90% ammonium sulfate;
(2) about 1% methyl hydrogen polysiloxane;
(3) about 5% muscovite mica;
(4) about 5% magnesium aluminum silicate.

Such a retardant is available from Ansul Fire Protection, Inc. Ansul Fire Protection Inc. is located in Marinette, Wis.

The inventive composition is conveniently made by first blending the thermoplastic with the asphalt a temperatures between 325° and 425° F. Next, the flame retardant is added to the thermoplastic modified asphalt by mixing, preferably by paddle mixers where the modified asphalt is maintained above 325° F.

The inventive composition may be used in several different roofing applications and on different carriers. The composition may be used in conjunction with polyester or fiberglass reinforcements.

The following example is presented to show a preferred embodiment of the invention. It is not intended to limit the scope or content of the disclosure or invention.

The preferred composition includes by weight:
(1) about 58.6% asphalt;
(2) about 14.7% styrene-butadiene-styrene;
(3) about 24% ammonium sulfate;
(4) about 0.7% methyl hydrogen polysiloxane;
(5) about 1% muscovite mica; and
(6) about 1% magnesium aluminum silicate.

The composition has been tested by UL under UL 790 conditions. UL has awarded the preferred composition a Class A ranking.

The preferred composition may be made by:
(1) Heating the asphalt to about 350-400° F.;
(2) Adding and mixing styrene-butadiene-styrene ("SBS") into the heated asphalt; and
(3) Adding and mixing the flame retardant into the heated modified bitumen with a paddle mixer.

The example and descriptions provided are meant to be a clear indication of the inventive composition. However, reasonable modifications and variations are possible without departing from the spirit or scope of the invention.

What is claimed is:
1. A flame retardant composition comprising:
   (a) about 45-65% wt. asphalt;
   (b) about 1-20% wt. styrene-butadiene-styrene polymer;
   (c) about 15-40% wt. flame retardant where the flame retardant comprises about:
      (i) 65-95% wt. ammonium sulfate,
      (ii) 1-5% wt. methyl hydrogen polysiloxane.
2. A flame retardant asphalt composition comprising about:
   (a) 58.6% bitumen;
   (b) 14.7% styrene-butadiene-styrene;
   (c) 26.7% wt. flame retardant where the flame retardant comprises about:
      (i) 93% wt. ammonium sulfate,
      (ii) 1% wt. methyl hydrogen polysiloxane;
      (iii) 3% wt. muscovite mica; and
      (iv) 3% wt. magnesium silicate.